United States Patent [19]
Brown

[11] Patent Number: 5,733,013
[45] Date of Patent: Mar. 31, 1998

[54] VEHICLE OCCUPANT RESTRAINT APPARATUS

[75] Inventor: Louis R. Brown, Oxford, Mich.

[73] Assignee: TRW Vehicle Safety Systems Inc., Lyndhurst, Ohio

[21] Appl. No.: 752,044

[22] Filed: Nov. 19, 1996

[51] Int. Cl.$^6$ ................................................ B60R 22/34
[52] U.S. Cl. ................................. 297/483; 280/808
[58] Field of Search ................................ 297/475, 483, 297/484; 280/808

[56] References Cited

U.S. PATENT DOCUMENTS

| | | |
|---|---|---|
| 4,568,106 | 2/1986 | Yokoyama . |
| 4,616,850 | 10/1986 | Sedlmayr . |
| 4,730,875 | 3/1988 | Yoshitsugu . |
| 4,974,876 | 12/1990 | Svensson et al. . |
| 5,358,310 | 10/1994 | Nemoto . |
| 5,441,332 | 8/1995 | Verellen . |
| 5,452,941 | 9/1995 | Halse et al. ............... 297/483 X |
| 5,609,396 | 3/1997 | Loxton et al. ............. 297/483 X |
| 5,611,604 | 3/1997 | Thomas et al. ............ 280/808 X |

FOREIGN PATENT DOCUMENTS 374893  6/1990  European Pat. Off. ............. 280/808

OTHER PUBLICATIONS

Webster, Larry, "Chrysler Sebring JXi," *Car and Driver*, (Mar. 1996), 69–71 (best available copy).

*Primary Examiner*—Peter R. Brown
*Attorney, Agent, or Firm*—Tarolli, Sundheim, Covell, Tummino & Szabo

[57] ABSTRACT

A vehicle occupant restraint apparatus (10) includes seat belt webbing (16), a seat belt retractor (50), and a mounting structure (80) for mounting the retractor (50) on a shoulder portion (40) of a seat back (20). The apparatus (10) further includes a guide structure (52) having an elongated turning surface (192) which engages the webbing (16) to define a turn (190) in the webbing (16). Another mounting structure (142, 144, 146) mounts the guide structure (52) on an opposite shoulder portion 38 of the seat back (20), with the turning surface (192) in a vertically extending orientation. The guide structure (52) supports the webbing (16) for movement along and around the turning surface (192) upon extraction and retraction of the webbing (16) when a shoulder belt section (64) of the webbing (16) is moved back and forth across the seat back (20).

11 Claims, 4 Drawing Sheets

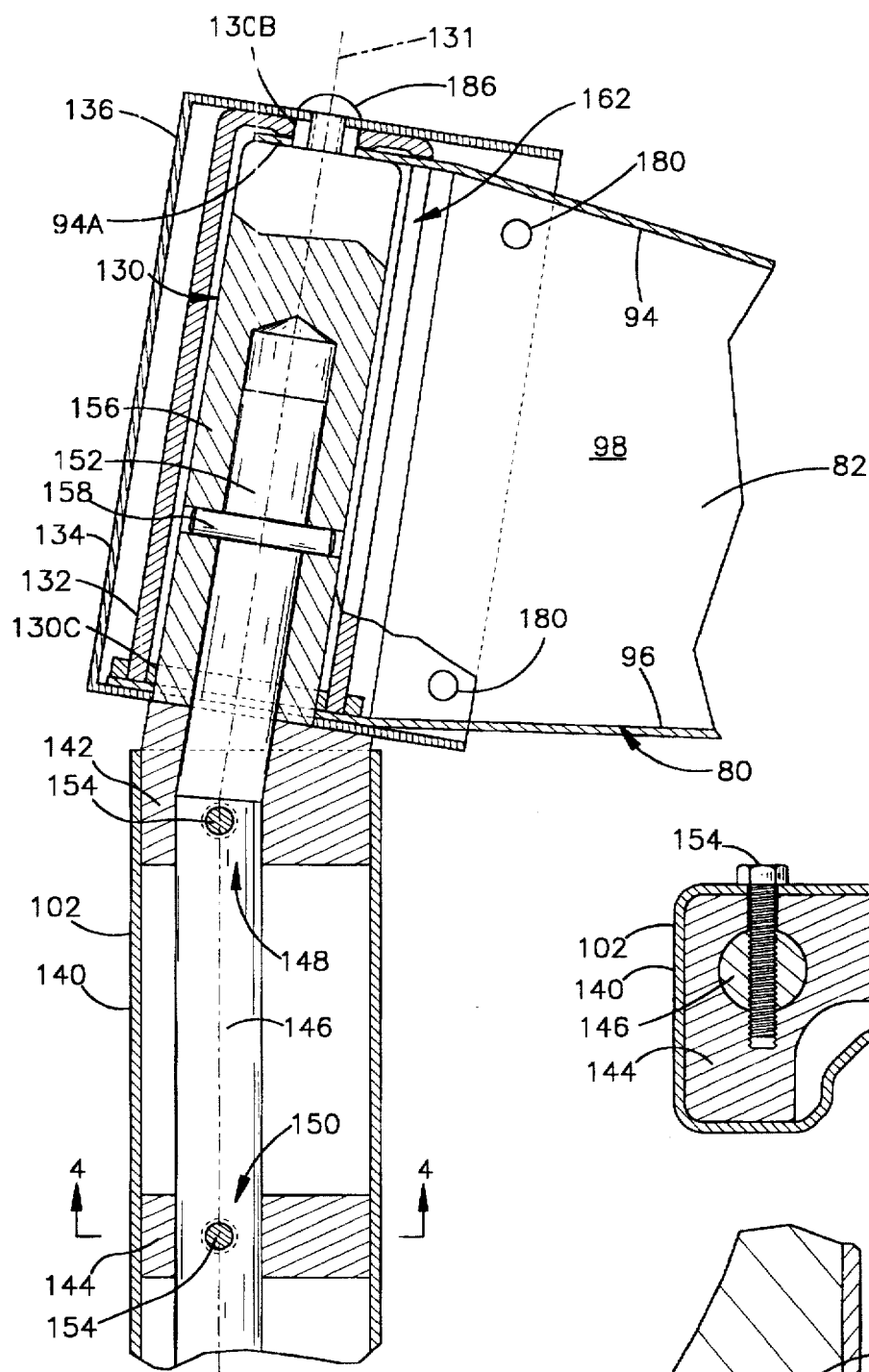
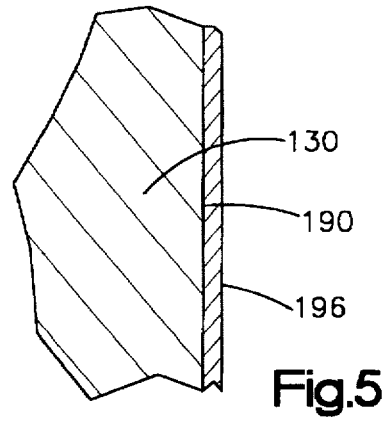
Fig.3
Fig.4
Fig.5

VEHICLE OCCUPANT RESTRAINT APPARATUS

FIELD OF THE INVENTION

The present invention relates to a seat belt system for restraining a vehicle occupant, and particularly relates to a seat-integrated seat belt system which is supported on a vehicle seat.

BACKGROUND OF THE INVENTION

A seat belt system directs seat belt webbing to extend across an occupant of a vehicle seat. For example, in a three point seat belt system, one end of the webbing is wound on a spool in a retractor, and the other end of the webbing is connected to a webbing anchor. The retractor and the anchor are both fixed to the vehicle at one side of the seat. A tongue is slidable along the length of the webbing. The system further includes a buckle which is fixed to the vehicle at the opposite side of the seat. When the tongue on the webbing is locked in the buckle, a lap belt section of the webbing extends from the anchor to the tongue across the occupant's lap. A shoulder belt section of the webbing extends from the retractor to the tongue across the occupant's torso. It may be desirable to adjust the height of the shoulder belt section of the webbing in accordance with the size of the vehicle occupant.

SUMMARY OF THE INVENTION

In accordance with the present invention, an apparatus comprises seat belt webbing, a seat belt retractor, and means for mounting the retractor on a shoulder portion of a seat back. The apparatus further comprises a guide structure having an elongated turning surface which engages the webbing to define a turn in the webbing. Another mounting means mounts the guide structure on an opposite shoulder portion of the seat back with the turning surface in a vertically extending orientation. The guide structure supports the webbing for movement along and around the turning surface upon extraction and retraction of the webbing when a shoulder belt section of the webbing is moved back and forth across the seat back.

An apparatus constructed in accordance with the present invention enables the shoulder belt section of the webbing to fit comfortably against the shoulder of a seated vehicle occupant. This is because the guide structure supports the webbing for vertical movement along the length of the turning surface so that the height of the shoulder belt can vary in accordance with the size of the vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is an enlarged view, partly in section, of parts shown in FIG. 2;

FIG. 4 is a view taken on line 4—4 of FIG. 3;

FIG. 5 is an enlarged partial view of a part shown in FIGS. 3 and 4, and

DESCRIPTION OF PREFERRED EMBODIMENTS

Figure 1:
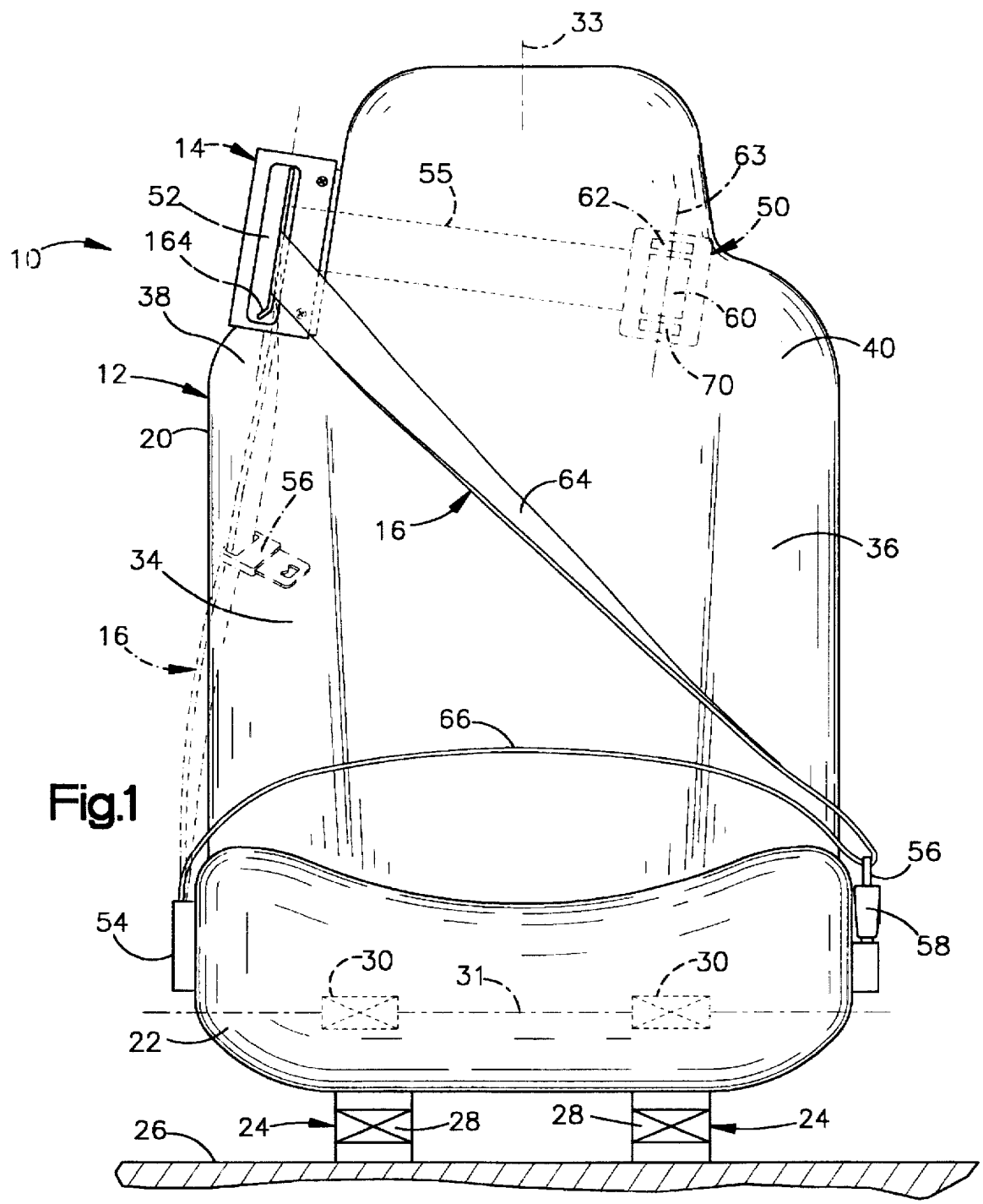
FIG. 1 is a front view of a vehicle seat and a vehicle seat belt system which together comprise a preferred embodiment of the present invention.

An apparatus 10 comprising a preferred embodiment of the present invention is shown in FIG. 1. The apparatus 10 includes a vehicle seat 12 and a seat belt system 14. The seat belt system 14 includes seat belt webbing 16 for restraining an occupant of the seat 12. In the preferred embodiment of the present invention, the seat belt system 14 is a seat-integrated system which is supported entirely on the seat 12.

The seat 12 includes a seat back 20 and a seat bottom or cushion 22. The seat cushion 22 is supported on a pair of track assemblies 24 (shown schematically) which are fixed to the vehicle floor 26. Each track assembly 24 includes a respective bearing assembly 28. The bearing assemblies 28 enable the seat 12 to slide along the track assemblies 24 for adjustment of the position of the seat 12. Additional bearing assemblies 30 support the seat back 20 for pivotal movement about a horizontal axis 31. Raising and lowering of the seat back 20 pivotally about the axis 31, as well as movement of the seat 12 along the track assemblies 24, can be controlled by any suitable manual and/or motorized mechanism (not shown) known in the art.

The seat back 20 is elongated vertically, and thus has a vertically extending longitudinal centerline 33. By "vertically extending" it is meant that the centerline 33 is vertical, substantially vertical, or inclined within a range corresponding to the range throughout which the seat back 20 can be raised or lowered pivotally about the horizontal axis 31.

Since the seat 12 is viewed from the front in FIG. 1, a right hand side 34 of the seat back 20 is located to the left of the centerline 33 in FIG. 1, and a left hand side 36 of the seat back 20 is located to the right of the centerline 33 in FIG. 1. The right hand side 34 of the seat back 20 has a right shoulder portion 38. The left hand side 36 of the seat back 20 has a left shoulder portion 40. The right and left hand sides 34 and 36 of the seat back 20 are hereafter referred to as the first and second sides, with first and second shoulder portions 38 and 40, respectively.

In addition to the webbing 16, the seat belt system 14 includes a retractor 50 and a guide structure 52. The retractor 50 is mounted on the second shoulder portion 40 of the seat back 20, and is fully enclosed within the seat back 20. The guide structure 52 is mounted on the first shoulder portion 38 of the seat back 20, and can be partially or fully enclosed within the seat back 20 cushions and trim. A concealed upper section 55 of the webbing 16 extends across the inside of the seat back 20 from the retractor 50 to the guide structure 52. The webbing 16 further extends downward along the outside of the seat back 20 to a webbing anchor 54 on the seat cushion 22. A tongue 56 is slidable along the length of the webbing 16, and is releasably lockable in a buckle 58 at the opposite side of the seat cushion 22.

The retractor 50 is shown schematically in FIG. 1. As known in the art, the retractor 50 has a spool 60 upon which the webbing 16 is wound. A rewind spring 62 biases the spool 60 to rotate about an axis 63 in a winding direction. The webbing 16 is movable back and forth between a fully retracted position and a fully extracted position upon winding and unwinding of the webbing 16 on the spool 60.

When the webbing 16 is in the fully retracted position, it is fully wound onto the spool 60, and extends downward from the guide structure 52 along the first side 34 of the seat back 20, as shown in dashed lines in FIG. 1. When the webbing 16 is in the fully extracted position, as shown in solid lines in FIG. 1, it is fully unwound from the spool 60, and is extracted from the retractor 50 sufficiently to enable the tongue 56 to reach the buckle 58. A shoulder belt section 64 of the webbing 16 then extends across the seat 12 from the guide structure 52 to the tongue 56. A lap belt section 66 of the webbing 16 extends across the seat 12 from the anchor 54 to the tongue 56.

The rewind spring 62 in the retractor 50 is stressed as the spool 60 rotates in an unwinding direction when a vehicle occupant extracts the webbing 16 from the retractor 50 and moves the tongue 56 toward the buckle 58. When the vehicle occupant releases the tongue 56 from the buckle 58, the rewind spring 62 rotates the spool 60 in the winding direction to retract the webbing 16 into the retractor 50, and thereby to move the webbing 16 back to the fully retracted position. As known in the art, the retractor 50 further includes a locking mechanism 70 for blocking unwinding rotation of the spool 60 upon the occurrence of a crash or other emergency condition for which the webbing 16 is required to restrain an occupant of the seat 12. The locking mechanism 70 is gimballed in a known manner to compensate for changes in the seat back angle.

Figure 2:
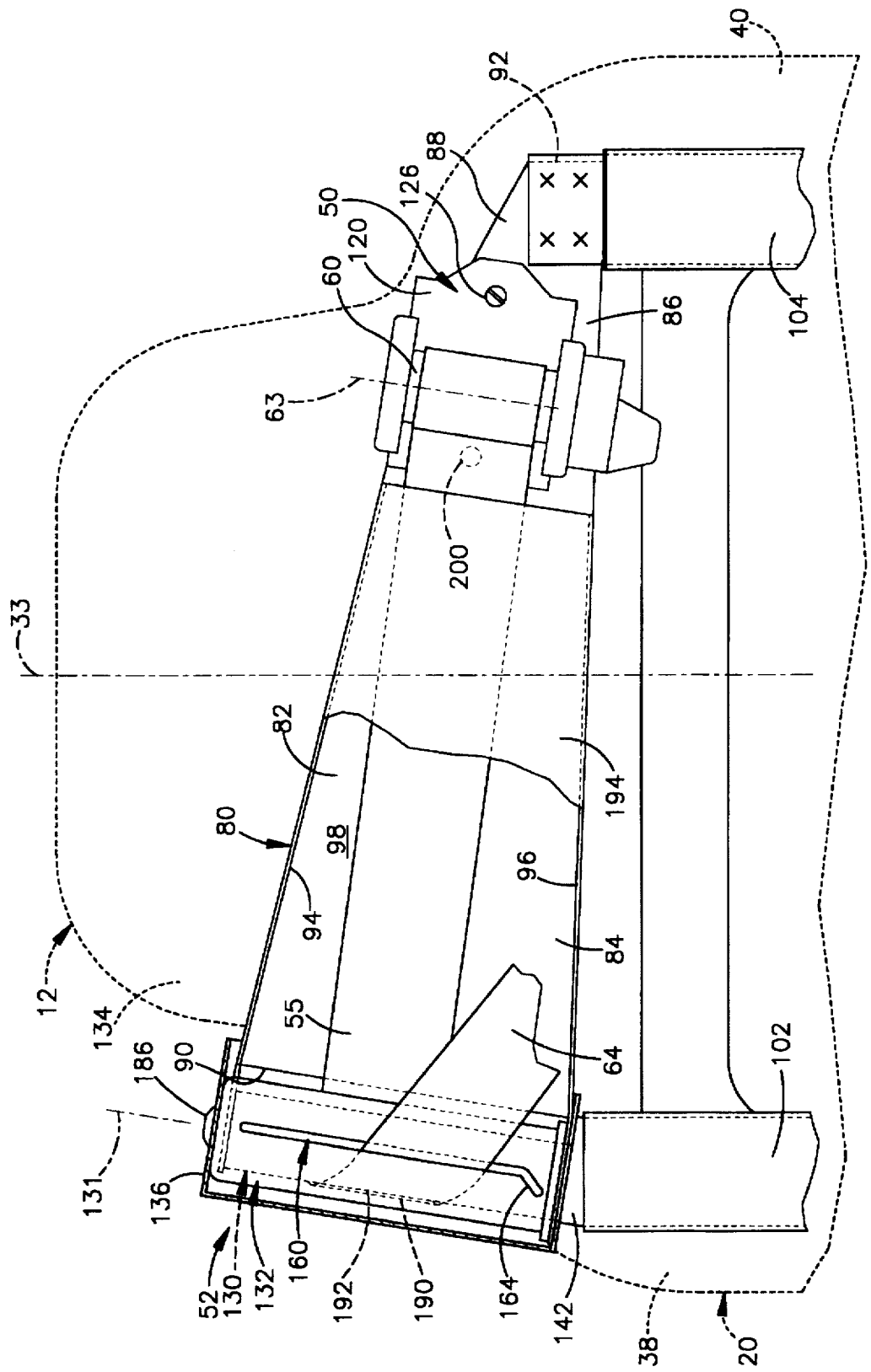
FIG. 2 is an enlarged partial view of the apparatus shown in FIG. 1.

As shown in greater detail in FIG. 2, the retractor 50 and the guide structure 52 are located at opposite ends of a bracket 80 which extends horizontally across the seat back 20 between the first and second shoulder portions 38 and 40. As shown separately in FIGS. 3 and 4, the bracket 80 has a horizontally elongated base wall 82 with a first tapered portion 84, an intermediate portion 86, and a second tapered portion 88. The first tapered portion 84 of the base wall 82 has an edge 90 defining a first, relatively wide end of the bracket 80. The second tapered portion 88 of the base wall 82 has an edge 92 defining a second, relatively narrow end of the bracket 80.

The bracket 80 further has upper and lower flanges 94 and 96. The flanges 94 and 96 extend fully along the length of the first tapered portion 84 of the base wall 82, and face toward each other across the width of the first tapered portion 84. In this configuration, the flanges 92 and 94 and the first tapered portion 84 of the base wall 82 together define a tapered, channel-shaped passage 98 extending longitudinally between the first end 90 of the bracket 80 and the intermediate portion 86 of the base wall 92. A fastener 126 fastens a base plate 120 of the retractor 50 to the intermediate portion 86 of the base wall 82. The retractor 50 is thus mounted on the second shoulder portion 40 of the seat back 20 in a position in which the spool axis 63 has a vertically extending orientation.

The guide structure 52 is located at the first shoulder portion 38 of the seat back 20 adjacent to the first end 90 of the bracket 80. As shown in FIG. 2 the guide structure 52 includes a cylindrical guide bar 130. The guide bar 130 has a longitudinal central axis 131, and is contained within a generally cylindrical sleeve 132. The axis 131 of the guide bar 130 has a vertically extending orientation, and is preferably parallel to the spool axis 63 (FIG. 2). In the first embodiment of the present invention, the guide structure 52, and hence the axis 131 of the guide bar 130, is tilted slightly toward an adjacent headrest portion 134 of the seat back 20 so as to have an orientation which is complementary to the shape of the seat back 20. A cover portion 136 of the guide structure 52 encloses the sleeve 132 and the guide bar 130.

The guide bar 130 is mounted on a first vertically extending beam 102 in the seat back 20 in the manner shown in FIGS. 3 and 4. The first beam 102 has a hollow upper end portion 140. A pair of support blocks 142 and 144 are closely received within the upper end portion 140 of the first beam 102. A cylindrical support shaft 146 extends longitudinally through passages 148 and 150 in the support blocks 142 and 144, respectively. The support shaft 146 has an upper end portion 152 projecting upward from the first beam 102 along the axis 131. A pair of fasteners 154 fasten the support shaft 146 and the support blocks 142 and 144 immovably to the first beam 102. The guide bar 130 has a hollow lower end portion 156 which is closely received telescopically over the upper end portion 152 of the support shaft 146. The guide bar 130 is immovably fastened to the support shaft 146 by another fastener 158.

The sleeve 132, which contains the guide bar 130, has a circumferentially spaced pair of longitudinally extending slots 160 and 162. As best shown in FIG. 2, the first slot 160 is parallel to the axis 131 along nearly its entire length, but has a short lower end portion 164 which turns away from the axis 131. The second slot 162 (FIG. 3) is parallel to the axis 131 along its entire length, and is wider than the first slot 160.

The sleeve 132 rotates on the guide bar 130 outer surfaces at 130B and 130C. Rotation of the sleeve 132 is limited to about 30° by the shape of an upper tab 94A on the bracket 80 and the width of the slot 162 in the sleeve 132, as shown in FIG. 3. This rotation permits the slots 160 and 162 to align with the webbing 16 so that the normal force and friction of the webbing 16 in contact with the sleeve 132 is minimized.

The cover portion 136 of the guide structure 52 has a vertically elongated slot 184. As shown in FIG. 1, the slot 184 in the cover 136 is substantially wider than, and is located in front of, the first slot 160 in the sleeve 132. A fastener 186 (FIG. 2) at the upper end of the guide structure 52 fastens the cover 136 immovably to the guide bar 130.

As shown in FIG. 2, the guide bar 130 engages the webbing 16 so as to define a turn 190 in the webbing 16. The turn 190 in the webbing 16 extends partially around a vertically elongated, cylindrical outer surface 192 of the guide bar 130. The shoulder belt section 64 of the webbing 16 projects tangentially from the cylindrical outer surface 192 of the guide bar 130. The shoulder belt section 64 thus extends outward through the first slot 160 in the sleeve 132, and further outward through the adjacent slot 184 in the cover 136.

The upper section 55 of the webbing 16 also projects tangentially from the cylindrical outer surface 192 of the guide bar 130. The upper section 55 of the webbing 16 thus extends from the guide bar 130 into the passage 98 through the second slot 162 in the sleeve 132, and continues longitudinally through the passage 98 toward the retractor 50 (FIG. 2). Preferably, the upper section 55 of the webbing 16 is enclosed within the passage 98 by a plastic cover panel 194. The cover panel 194 extends between the flanges 94 and 96 opposite the base wall 82 of the bracket 80, and is preferably fixed to the flanges 94 and 96 by clips molded into the cover panel 194. The cover panel 194 and the three walls of the bracket 80 form a protective enclosure so that the motion of the webbing 16 will not be obstructed by the seat cushion materials.

When the webbing 16 is moved back and forth between the positions shown in FIG. 1, it moves along and around the cylindrical outer surface 192 of the guide bar 130. Specifically, the webbing 16 slides circumferentially around the cylindrical outer surface 192 of the guide bar 130 whenever it is extracted or retracted upon being unwound from, or wound onto, the retractor spool 60. When the tongue 56 is locked in the buckle 58, the shoulder belt section 64 of the webbing 16 is drawn against the torso of the seated occupant under tension induced by the rewind spring 62 in the retractor 50. If the occupant is of a relatively small size, the shoulder belt section 64 will thus take a position at or near the position in which it is shown in FIG. 1. If the occupant is of a larger size, the occupant's right shoulder will lift the shoulder belt section 64 upward adjacent to the guide structure 52. The turn 190 in the webbing 16 will then move upward along the length of the cylindrical outer surface 192 under the influence of both the occupant's shoulder and the tension imparted by the rewind spring 62. The webbing 16 will slide along the guide bar 130 in this manner until it reaches a position in which the shoulder belt section 64 rests comfortably against the occupant's shoulder. A low friction coating 196 (FIG. 5) is preferably provided on the cylindrical outer surface 192 of the guide bar 130 to promote sliding movement of the webbing 16 along and around the guide bar 130 in this manner. The coating 196 may be formed of any suitable material known in the art.

The range through which the webbing 16 can slide vertically along the guide bar 130 corresponds with a predetermined range of vehicle occupant sizes. Moreover, when the webbing 16 slides vertically along the guide bar 130, the upper section 55 of the webbing 16 moves pivotally relative to the retractor 50 at the other side of the seat back 20. Such pivotal movement of the upper section 55 tends to introduce one or more longitudinally extending creases in the upper section 55. However, in accordance with a particular feature of the present invention, the guide structure 52 and the retractor 50 are spaced apart across the seat back 20 such that the length of the upper section 55 is great enough for the upper section 55 to pivot in this manner without creasing. When the webbing 16 has returned to the fully retracted position, as shown in dashed lines in FIG. 1, it turns transversely into the lower end portion 164 of the first slot 160 in the sleeve 132. The combination of slots 160 and 184, plus the narrow clearance between the sleeve 132 and the guide bar 130, helps to avoid creasing and roping of the webbing 16 between the guide structure 52 and the anchor 54.

In accordance with another particular feature of the present invention, a shear pin 200 (FIG. 2) extends between the base plate 120 of the retractor 50 and the base wall 82 of the bracket 80. When the vehicle experiences a collision, the emergency locking mechanism 70 in the retractor 50 blocks unwinding rotation of the spool 60 so that the webbing 16 can restrain an occupant of the seat 12. The occupant then moves forcefully against the webbing 16. The kinetic energy of the occupant imparts tension to the webbing 16 which tends to pull the shoulder belt section 64 outward from the guide structure 52. If a small occupant is using the seat belt system 14, this causes the turn 190 in the webbing 16 to move vertically downward along the guide bar 130, and thus causes the upper section 55 of the webbing 16 to move pivotally downward relative to the retractor 60. As the upper section 55 of the webbing 16 moves pivotally downward, it urges the retractor 50 to move pivotally about the fastener 126 in a counterclockwise direction, as viewed in FIG. 2. This induces shear stress in the shear pin 200. If the shear stress reaches a predetermined elevated level, the shear pin 200 ruptures and releases the base plate 120 to pivot about the fastener 126 under the influence of the tension in the webbing 16. In this manner, the kinetic energy of the vehicle occupant is partially dissipated by rupturing of the shear pin 200.

Also, when the vehicle experiences a collision and the occupant imparts tension to the webbing 16, the bracket 80 functions as a rigid lateral support in the seat back 20 due to its rigid interconnection with the guide bar 130, the retractor 50, and the first and second seat beams 102 and 104.

Figure 6:
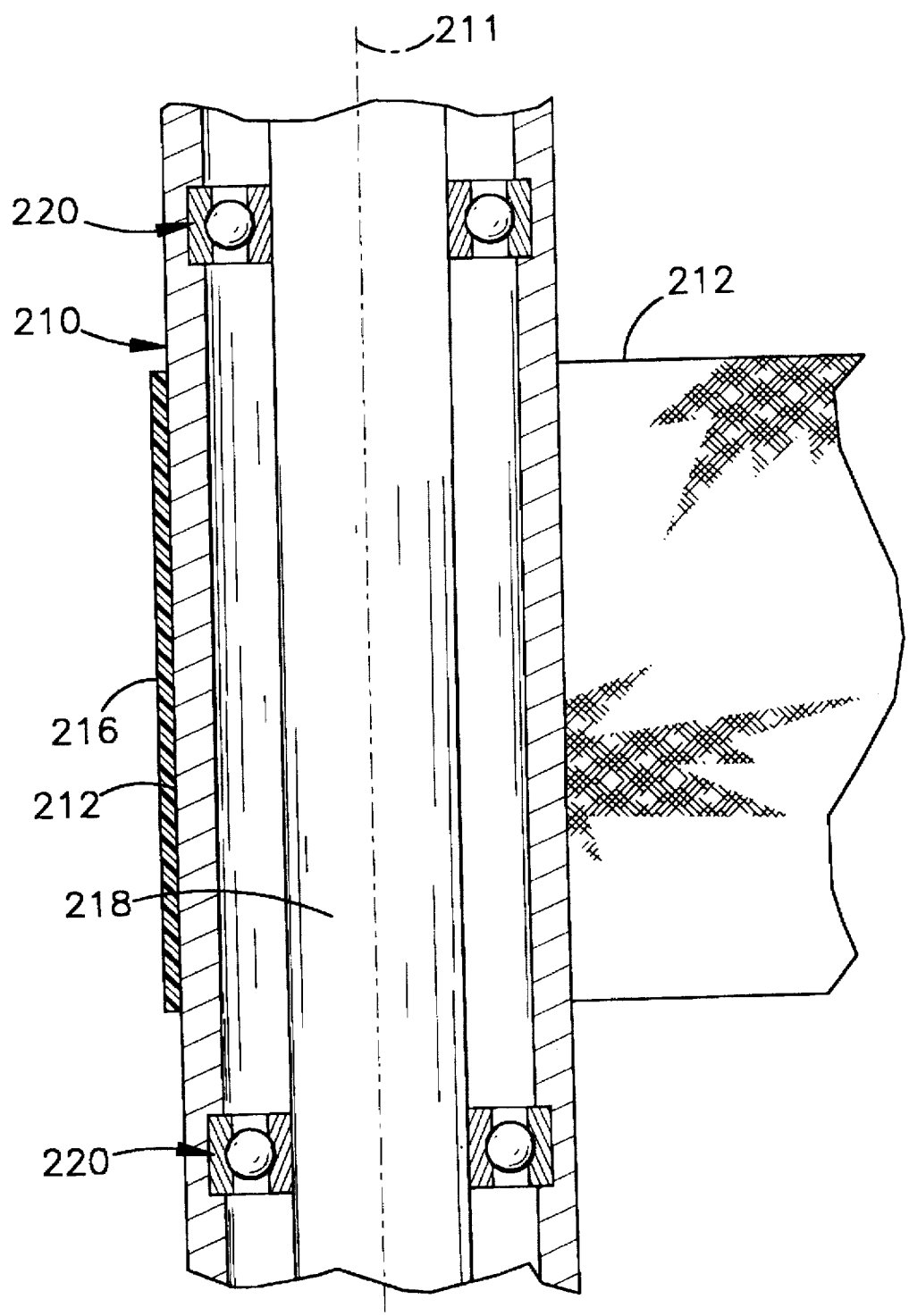
FIG. 6 is a partial view of parts of an apparatus comprising a second embodiment of the present invention.

A second embodiment of the present invention is shown partially in FIG. 6. The second embodiment includes an alternative guide bar 210 in place of the guide bar 130 described above. Like the guide bar 130, the guide bar 210 has a vertically extending central axis 211, and has a vertically elongated, cylindrical outer surface 212 which engages seat belt webbing 214 so as to define a turn 216 in the webbing 214. Further like the guide bar 130 described above, the guide bar 210 is mounted concentrically on a support shaft 218. However, unlike the guide bar 130, the guide bar 210 is not fastened immovably to the support shaft 218. Instead, the guide bar 210 is rotatably supported on the support shaft 218 by a pair of bearing assemblies 220.

When the webbing 214 moves longitudinally upon extraction from, and retraction in, a corresponding seat belt retractor (not shown), the webbing 214 moves circumferentially around the axis 211. The webbing 214 then causes the guide bar 210 to rotate about the axis 211. Such rotation of the guide bar 210 eliminates the radial friction forces on the surface of the webbing 214, and increases the axial friction forces between the webbing 214 and guide bar outer surface 212, without the use of a low friction coating on the guide bar 210. This embodiment reduces the overall webbing extraction force while the axial friction forces act to hold the webbing 214 in the proper vertical alignment with the upper edge of the occupant's shoulder.

From the above description of the invention, those skilled in the art will perceive improvements, changes and modifications. For example, rather than being mounted on a bracket or the like, a retractor could be mounted directly on the frame of a seat back in accordance with the present invention, with welds and/or fasteners being used to secure the retractor to the frame in any suitable manner. A guide structure also could be mounted on the frame of a seat back in a manner different from that described above. For example, a guide structure could be fixed to an elongated bracket or other supporting structure, with both ends of the bracket being fixed directly to the frame. Such improvements, changes and modifications within the skill of the art are intended to be covered by the appended claims.

Having described the invention, the following is claimed:

1. Apparatus comprising:

a vehicle seat back having right and left sides with right and left shoulder portions;

seat belt webbing;

a seat belt retractor mounted on one of said shoulder portions, said retractor comprising means for extraction and retraction of said webbing; and a guide structure mounted on the other of said shoulder portions, said guide structure having an elongated, vertically extending turning surface engaging said webbing to define a turn in said webbing;

said guide structure supporting said webbing for movement along and around said turning surface upon extraction and retraction of said webbing when a shoulder belt section of said webbing is moved back and forth across said seat back between said right and left sides.

2. Apparatus as defined in claim 1 wherein said guide structure supports said webbing for movement along said turning surface throughout a predetermined range corresponding to a predetermined range of vehicle occupant sizes.

3. Apparatus as defined in claim 1 wherein said retractor has a spool with a vertically extending axis of rotation.

4. Apparatus as defined in claim 1 wherein said turning surface is a cylindrical surface of a guide bar.

5. Apparatus as defined in claim 4 wherein said guide bar is immovably mounted on said seat back and supports said webbing for sliding movement along and around said guide bar.

6. Apparatus as defined in claim 4 wherein said guide bar is supported for rotation under the influence of said webbing.

7. Apparatus as defined in claim 4 wherein said guide structure comprises a sleeve with circumferentially spaced slots through which said webbing extends from said guide bar, said sleeve being rotatable on said guide bar throughout a limited angle.

8. Apparatus as defined in claim 7 wherein said slots in said sleeve and a narrow radial clearance between said sleeve and said guide bar comprise means for avoiding creasing and roping of said webbing.

9. Apparatus as defined in claim 1 further comprising a horizontally elongated bracket structure extending across said seat back between said right and left sides, said retractor being mounted on an end portion of said bracket structure, said guide structure being mounted on an opposite end portion of said bracket structure.

10. Apparatus as defined in claim 9 wherein said bracket structure defines an enclosed passage through which said webbing is movable longitudinally between said retractor and said guide structure.

11. Apparatus as defined in claim 9 wherein said bracket structure comprises means for providing rigid lateral support in said seat back.

* * * * *